United States Patent
Park et al.

(10) Patent No.: US 9,431,176 B2
(45) Date of Patent: Aug. 30, 2016

(54) MULTILAYER CERAMIC CAPACITOR HAVING MULTI-LAYERED ACTIVE LAYERS AND BOARD HAVING THE SAME

(71) Applicant: SAMSUNG ELECTRO-MECHANICS CO., LTD., Suwon-Si, Gyeonggi-Do (KR)

(72) Inventors: Heung Kil Park, Suwon-Si (KR); Doo Young Kim, Suwon-Si (KR); Young Ghyu Ahn, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 127 days.

(21) Appl. No.: 14/259,984

(22) Filed: Apr. 23, 2014

(65) Prior Publication Data

US 2015/0124372 A1    May 7, 2015

(30) Foreign Application Priority Data

Nov. 6, 2013    (KR) .......................... 10-2013-0133963

(51) Int. Cl.
*H01G 4/30* (2006.01)
*H01G 4/12* (2006.01)
*H01G 4/232* (2006.01)

(52) U.S. Cl.
CPC .............. *H01G 4/30* (2013.01); *H01G 4/1209* (2013.01); *H01G 4/232* (2013.01)

(58) Field of Classification Search
CPC ....... H01G 4/30; H01G 4/1209; H01G 4/232
See application file for complete search history.

(56) References Cited

U.S. PATENT DOCUMENTS

| 5,517,385 | A * | 5/1996 | Galvagni | H01G 4/385 361/312 |
| 5,657,199 | A * | 8/1997 | Devoe | H01G 4/38 257/E23.004 |
| 5,757,611 | A * | 5/1998 | Gurkovich | H01L 23/49822 257/E23.062 |
| 6,507,498 | B1 * | 1/2003 | Klee | H03H 1/00 361/301.4 |
| 6,985,349 | B2 * | 1/2006 | Smyth | H01L 23/49822 257/E23.062 |
| 7,333,318 | B2 * | 2/2008 | Hidaka | H01G 4/12 361/306.1 |
| 8,232,479 | B2 * | 7/2012 | Satou | H01G 2/065 174/126.1 |
| 2004/0257749 | A1 * | 12/2004 | Otsuka | H01G 2/065 361/306.3 |
| 2012/0224298 | A1 | 9/2012 | Kim et al. | |

FOREIGN PATENT DOCUMENTS

| JP | 2000-243657 A | 9/2000 |
| JP | 2002-313674 A | 10/2002 |
| KR | 2012-0099978 A | 9/2012 |

OTHER PUBLICATIONS

Notice of Office Action dated Sep. 30, 2014 issued in Korean Patent Application No. 10-2013-0133963 (English translation).

* cited by examiner

*Primary Examiner* — David M Sinclair
(74) *Attorney, Agent, or Firm* — McDermott Will & Emery LLP (57) ABSTRACT

A multilayer ceramic electronic component including: a ceramic body having a plurality of dielectric layers stacked therein; active layers including a plurality of first and second internal electrodes formed to be alternately exposed to both end surfaces of the ceramic body with the dielectric layers interposed therebetween; and first and second external electrodes formed on the both end surfaces of the ceramic body and electrically connected to the first and second internal electrodes, respectively. The active layers may include a first active layer including a ferroelectric layer and a second active layer including a paraelectric layer, the first and second active layers being alternately stacked.

12 Claims, 6 Drawing Sheets

MULTILAYER CERAMIC CAPACITOR HAVING MULTI-LAYERED ACTIVE LAYERS AND BOARD HAVING THE SAME

CROSS-REFERENCE TO RELATED APPLICATION

This application claims the benefit of Korean Patent Application No. 10-2013-0133963 filed on Nov. 6, 2013, with the Korean Intellectual Property Office, the disclosure of which is incorporated herein by reference.

BACKGROUND

The present disclosure relates to a multilayer ceramic electronic component and a board having the same.

Electronic components using a ceramic material include a capacitor, an inductor, a piezoelectric element, a varistor, a thermistor, and the like.

Among ceramic electronic components, a multilayer ceramic capacitor (MLCC) has advantages such as compactness, guaranteed high capacitance, and ease of mounting.

Such an MLCC is a chip-type condenser mounted on circuit boards of various electronic products including display devices such as liquid crystal displays (LCDs), plasma display panels (PDPs) and the like, as well as including computers, personal digital assistants (PDA), mobile phones, and the like, to serve to charge and discharge electricity.

An MLCC may include a plurality of stacked dielectric layers, internal electrodes having different polarities and opposed to each other with the dielectric layers interposed therebetween, and external electrodes electrically connected to the internal electrodes.

Since the dielectric layer has piezoelectric and electrostrictive properties, a piezoelectric phenomenon occurs between the internal electrodes when a direct current (DC) or alternating current (AC) voltage is applied to the multilayer ceramic capacitor, such that vibrations may be generated.

These vibrations may be transferred to a board on which the multilayer ceramic capacitor is mounted through external electrodes of the multilayer ceramic capacitor, such that the entirety of the board is a sound radiating surface to generate a vibration sound, noise.

The vibration sound may be within an audio frequency range of 20 to 20,000 Hz, which may cause listener discomfort and is referred to as an acoustic noise.

SUMMARY

An aspect of the present disclosure may provide a multilayer ceramic electronic component allowing for an effective reduction in noise caused by vibrations due to a piezoelectric phenomenon.

According to an aspect of the present disclosure, a multilayer ceramic electronic component may include: a ceramic body having a plurality of dielectric layers stacked therein; active layers including a plurality of first and second internal electrodes disposed to be alternately exposed to end surfaces of the ceramic body with the dielectric layers interposed between the first and second internal electrodes; and first and second external electrodes disposed on the end surfaces of the ceramic body and electrically connected to the first and second internal electrodes, respectively, wherein the active layers include a first active layer including a ferroelectric layer and a second active layer including a paraelectric layer, the first and second active layers being alternately stacked.

Each of the first and second active layers may include a plurality of first internal electrodes and a plurality of second internal electrodes.

Each of the first and second active layers may only include a single first internal electrode and a single second internal electrode.

The ferroelectric layer may be formed of at least one of a solid solution of $(Ba_{1-x}Ca_x)_m(Ti_{1-y}Zr_y)O_3$, $BaTiO_3$, $PbTiO_3$, and $SrTiO_3$.

The paraelectric layer may be formed of at least one of $(Ca,Sr)(Ti,Zr)O_3$, $BaO$—$Ti_{O2}$—$N_{d2O3}$, and $CaTi_{O3}$—$MgTi_{O3}$.

A dielectric constant of the first active layer may be 10 to 1,000 times that of the second active layer.

Upper and lower cover layers may be disposed on upper and lower portions of the active layers.

Each of the upper and lower cover layers may include a ferroelectric layer.

According to another aspect of the present disclosure, a board having a multilayer ceramic electronic component may include: a substrate having first and second electrode pads disposed on the substrate; and the multilayer ceramic electronic component installed on the substrate.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Hereinafter, a multilayer ceramic electronic component according to an exemplary embodiment of the present disclosure will be described as a multilayer ceramic capacitor, by way of example, but the present disclosure is not limited thereto.

Multilayer Ceramic Capacitor (MLCC)

Figure 1:
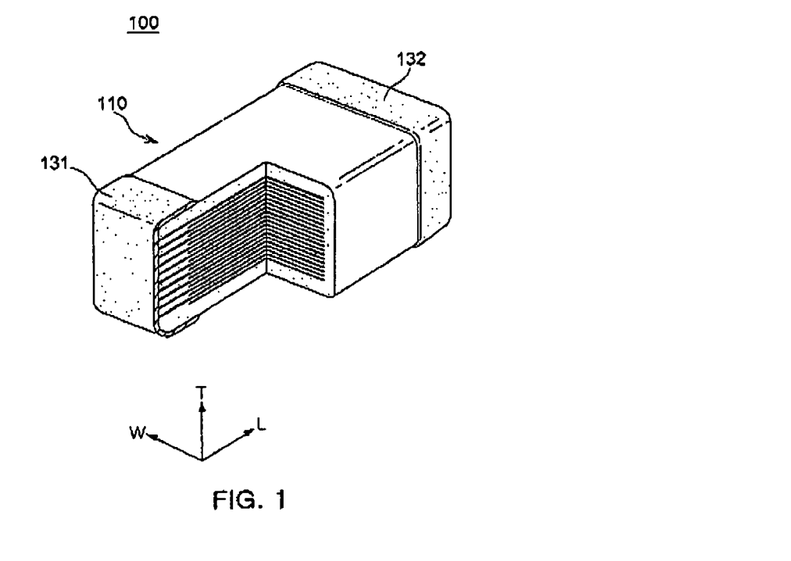
FIG. 1 is a partially cut-away perspective view schematically illustrating a multilayer ceramic capacitor (MLCC) according to an exemplary embodiment of the present disclosure.

FIG. 1 is a partially cut-away perspective view schematically illustrating a multilayer ceramic capacitor (MLCC) according to an exemplary embodiment of the present disclosure.

Referring to FIG. 1, a multilayer ceramic capacitor (MLCC) 100 according to the exemplary embodiment may include a ceramic body 110, active layers including a plurality of first and second internal electrodes 121 and 122, and first and second external electrodes 131 and 132.

The ceramic body 110 is formed by stacking a plurality of dielectric layers in a thickness direction and subsequently sintering the same, and a shape and dimensions of the ceramic body 110 and the number of stacked dielectric layers may not be limited to those illustrated in the exemplary embodiment.

Also, the plurality of dielectric layers forming the ceramic body 110 may be in a sintered state may integrated such that boundaries therebetween may not be readily apparent without using a scanning electron microscope (SEM).

The ceramic body 110 may have, for example, a hexahedral shape, but the shape of the ceramic body 110 is not particularly limited.

In the exemplary embodiment, surfaces of the ceramic body 110 opposing each other in the thickness direction will be defined as main surfaces, surfaces of the ceramic body 110 connecting the both main surfaces and opposing each other in a length direction will be defined as end surfaces, and surfaces of the ceramic body 110 connected to both end surfaces thereof to be perpendicular thereof and opposing each other in a width direction will be defined as side surfaces.

Directions of the ceramic body 110 will be defined in order to clearly describe exemplary embodiments of the present disclosure. L, W and T shown in the accompanying drawings refer to a length direction, a width direction, and a thickness direction of the ceramic body 110, respectively.

Here, the thickness direction may be used to have the same concept as that of a direction in which the dielectric layers are stacked.

Figure 2:
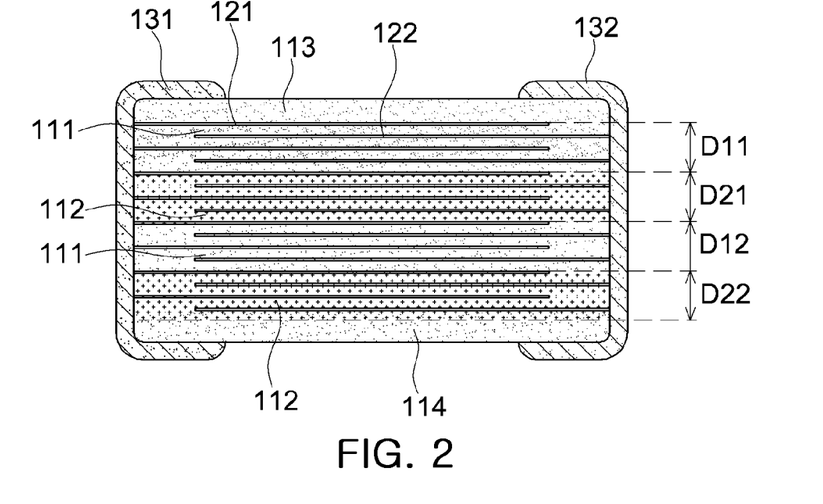
FIG. 2 is a cross-sectional view illustrating the MLCC according to the exemplary embodiment of the present disclosure, taken in length and thickness directions thereof.

FIG. 2 is a cross-sectional view illustrating the MLCC according to the exemplary embodiment of the present disclosure, taken in length and thickness directions thereof.

Referring to FIG. 2, the ceramic body 110 may include the active layers as parts contributing to capacitance formation of the capacitor, and upper and lower cover layers 113 and 114 formed on an upper portion and a lower portion of the active layers, respectively, as upper and lower margin portions.

The active layers may have a structure in which a plurality of dielectric layers 111 and 112 are provided, that is, first active layers D11 and D12 including ferroelectric layers 111 and second active layers D21 and D22 including paraelectric layers 112 are alternately stacked.

Also, each of the first active layers D11 and D12 and the second active layers D21 and D22 may be formed by alternately stacking the plurality of internal electrodes 121 and 122 with the ferroelectric layers 111 or the paraelectric layers 112 interposed therebetween.

In this case, the ferroelectric layers 111 and the paraelectric layers 112 may contain a ceramic powder and further contain various types of ceramic additive such as a transition metal oxide or carbide, a rare earth element, magnesium (Mg), aluminum (Al), and the like, an organic solvent, a plasticizer, a binder, a dispersing agent, or the like, added therein, as needed, in addition to the ceramic powder.

Also, thicknesses of the ferroelectric layers 111 and the paraelectric layers 112 may be arbitrarily changed according to a capacity design of the MLCC 100. Preferably, a thickness of a single dialectic layer may range from 0.01 μm to 1.00 μm, but the present disclosure is not limited thereto.

Also, the ferroelectric layers 111 may be formed of at least one of a solid solution of $(Ba_{1-x}Ca_x)_m(Ti_{1-y}Zr_y)O_3$, $BaTiO_3$, $PbTiO_3$, and $SrTiO_3$.

Also, the paraelectric layers 112 may be formed of at least one of $(Ca,Sr)(Ti,Zr)O_3$, $BaO$—$TiO_2$—$Nd_2O_3$, and $CaTiO_3$—$MgTiO_3$.

A dielectric constant of the ferroelectric layers 111 of the first active layers D11 and D12 may be 10 to 1,000 times that of the paraelectric layers 112 of the second active layers D21 and D22.

For example, the dielectric constant of the ferroelectric layers 111 may range from 2,000 to 4,000, while the dielectric constant of the paraelectric layers 112 may range from 20 to 150.

The upper and lower cover layers 113 and 114 may be formed of the same material and have the same configuration as those of the active layers, except that the upper and lower cover layers 113 and 114 do not include the internal electrodes. Preferably, the upper and lower cover layers 113 and 114 may be formed of the same material and have the same configuration as those of the ferroelectric layers 111 of the first active layers D11 and D12.

Also, the upper and lower cover layers 113 and 114 may be formed by stacking a single dielectric layer or two or more dielectric layers on upper and lower surfaces of the active layers in the thickness direction. Basically, the upper and lower cover layers 113 and 114 may serve to prevent damage to the first and second internal electrodes 121 and 122 due to physical or chemical stress.

The first and second internal electrodes 121 and 122 having different polarities may be formed by printing a conductive paste including a conductive metal on the respective dielectric layers 111 and 112 at a predetermined thickness.

In this case, the first and second internal electrodes 121 and 122 may be formed to be alternately exposed to both end surfaces of the ceramic body 110 in the stacking direction of the dielectric layers, while having the dielectric layers interposed therebetween. In this case, the first and second internal electrodes 121 and 122 may be electrically insulated from each other by the dielectric layers disposed therebetween.

Also, the first and second internal electrodes 121 and 122 may be electrically connected to the first and second external electrodes 131 and 132 through portions thereof alternately exposed to the both end surfaces of the ceramic body 110.

Thus, when a voltage is applied to the first and second external electrodes 131 and 132, electrical charges are accumulated between the first and second internal electrodes 121 and 122 opposed to each other, and in this case, a capacitance of the MLCC 100 may be proportional to an area of regions in which the first and second internal electrodes 121 and 122 overlap each other in the respective active layers 111.

A thickness of the first and second internal electrodes 121 and 122 may be determined according to an intended usage thereof. For example, a thickness of the first and second internal electrodes 121 and 122 may be determined within a range of 0.2 μm to 1.0 μm in consideration of a size of the ceramic body 110, for example, but the present disclosure is not limited thereto.

Also, a conductive metal contained in a conductive paste for forming the first and second internal electrodes 121 and 122 may be formed of one of silver (Ag), palladium (Pd), platinum (Pt), nickel (Ni), and copper (Cu), or an alloy thereof, or the like, but the present disclosure is not limited thereto.

Also, as a printing method of the conductive paste, a screen printing method, a gravure printing method, or the like, may be used, but the present disclosure is not limited thereto.

The first and second external electrodes 131 and 132 may be formed on the both end surfaces of the ceramic body 110 and may be in contact with the exposed portions of the first and second internal electrodes 121 and 122 to be electrically connected thereto.

The first and second external electrodes 131 and 132 may be formed of a conductive paste including a conductive metal, and the conductive metal may be Ag, Ni, Cu, or an alloy thereof, but the present disclosure is not limited thereto.

Meanwhile, first and second plating layers (not shown) may be formed on the first and second external electrodes 131 and 132 as needed.

The first and second plating layers may be provided to increase bonding strength between the MLCC 100 and a board when the MLCC 100 is mounted on the board by soldering.

For example, the first and second plating layers may have a structure including nickel (Ni) plating layers formed on the first and second external electrodes 131 and 132 and tin (Sn) plating layers formed on the nickel plating layers, but the present disclosure is not limited thereto.

In the present exemplary embodiment, each of the first and second active layers may be configured to include the plurality of first internal electrodes 121 and the plurality of second internal electrodes 122, but the present disclosure is not limited thereto.

Figure 3:
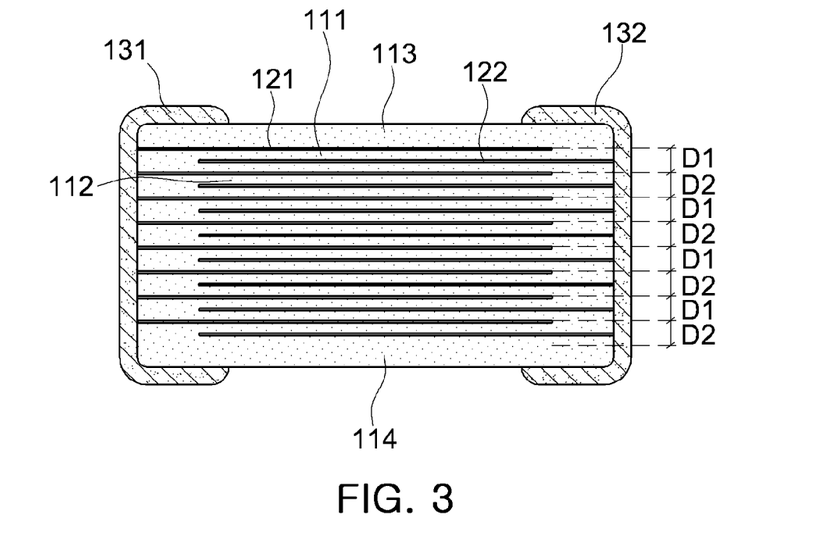
FIG. 3 is a cross-sectional view illustrating an MLCC according to another exemplary embodiment of the present disclosure, taken in length and thickness directions thereof.

For example, as illustrated in FIG. 3, according to another exemplary embodiment, only a single first internal electrode 121 and a single second internal electrode 122 may be included in each of first and second active layers D1 and D2, and the ceramic body 110 may be configured by alternately stacking the first and second active layers D1 and D2.

Here, since a formation structure of the first and second external electrodes 131 and 132 and the upper and lower cover layers 113 and 114 may be identical to that of the foregoing exemplary embodiment as described above, a detailed description thereof will be omitted to avoid redundancy.

Board Having MLCC

Figure 4:
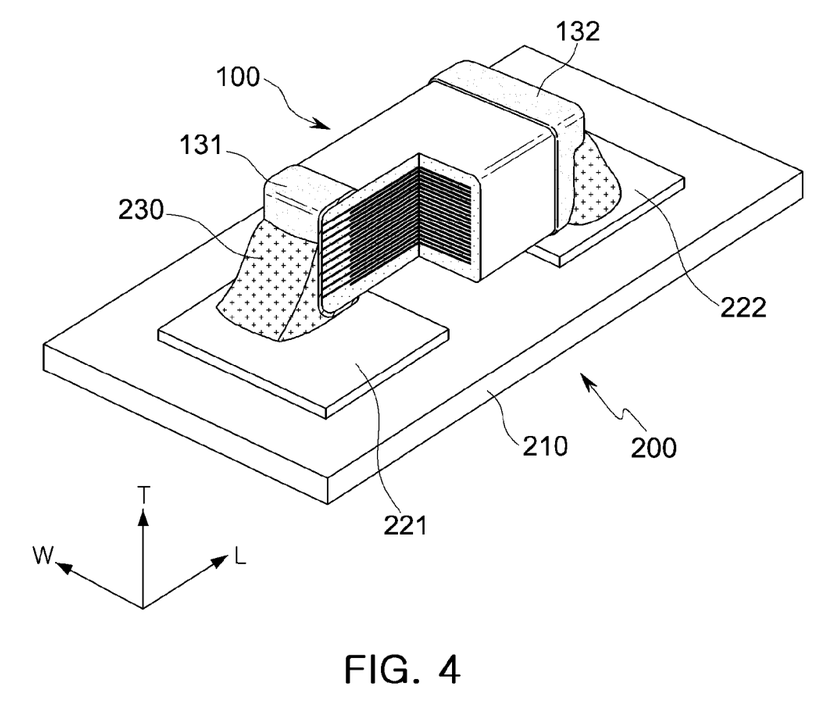
FIG. 4 is a partially cut-away perspective view schematically illustrating a state in which the multilayer ceramic capacitor (MLCC) according to the exemplary embodiment of the present disclosure is mounted on a board.
Figure 5:
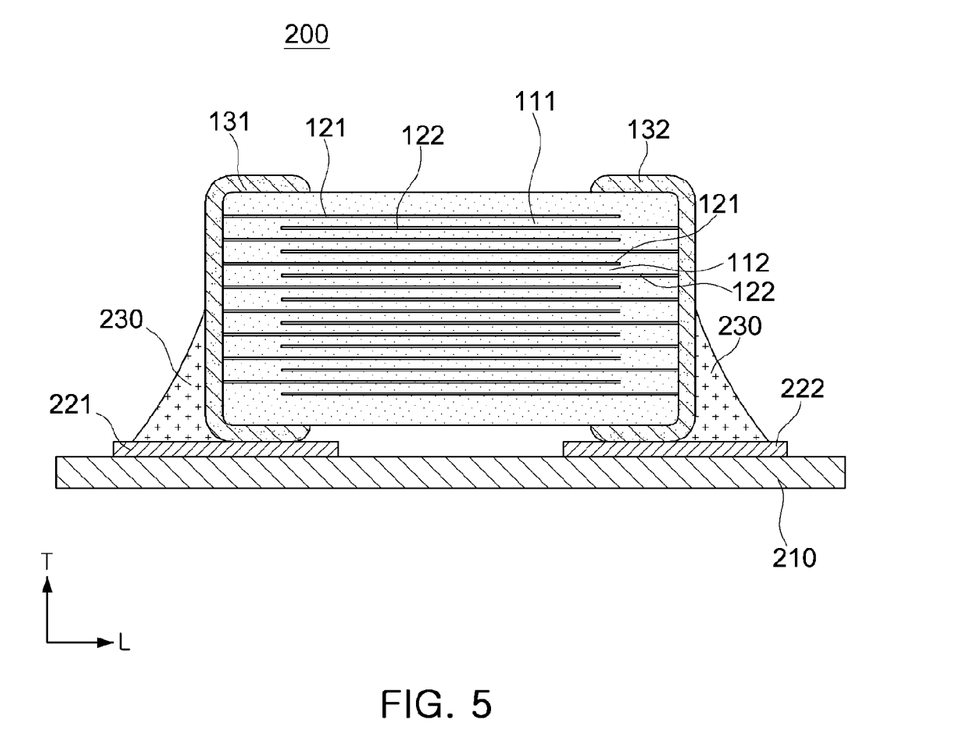
FIG. 5 is a cross-sectional view illustrating the board of FIG. 4 taken in length and thickness directions thereof.

FIG. 4 is a partially cut-away perspective view schematically illustrating a state in which the multilayer ceramic capacitor (MLCC) according to the exemplary embodiment of the present disclosure is mounted on a board. FIG. 5 is a cross-sectional view illustrating the board of FIG. 4 taken in length and thickness directions thereof.

Referring to FIGS. 4 and 5, a board 200 having the MLCC 100 according to the exemplary embodiment may include a substrate 210 on which the MLCC 100 is horizontally mounted and first and second electrode pads 221 and 222 formed on an upper surface of the substrate 210 to be spaced apart from each other.

Here, the MLCC 100 may be electrically connected to the substrate 210 by soldering parts 230 in a state in which the lower cover layer 114 of the MLCC 100 is disposed downwardly and the first and second external electrodes 131 and 132 are positioned on the first and second electrode pads 221 and 222 to be in contact therewith.

In the state in which the MLCC 100 is mounted on the substrate 210, when a voltage is applied to the MLCC 100, acoustic noise may be generated.

Here, sizes of the first and second electrode pads 221 and 222 may be used as an indicator for determining an amount of the soldering parts 230 connecting the first and second external electrodes 131 and 132 of the MLCC 100 and the first and second electrode pads 221 and 222, and a magnitude of acoustic noise may be adjusted according to the amount of the soldering parts 230.

Figure 6:
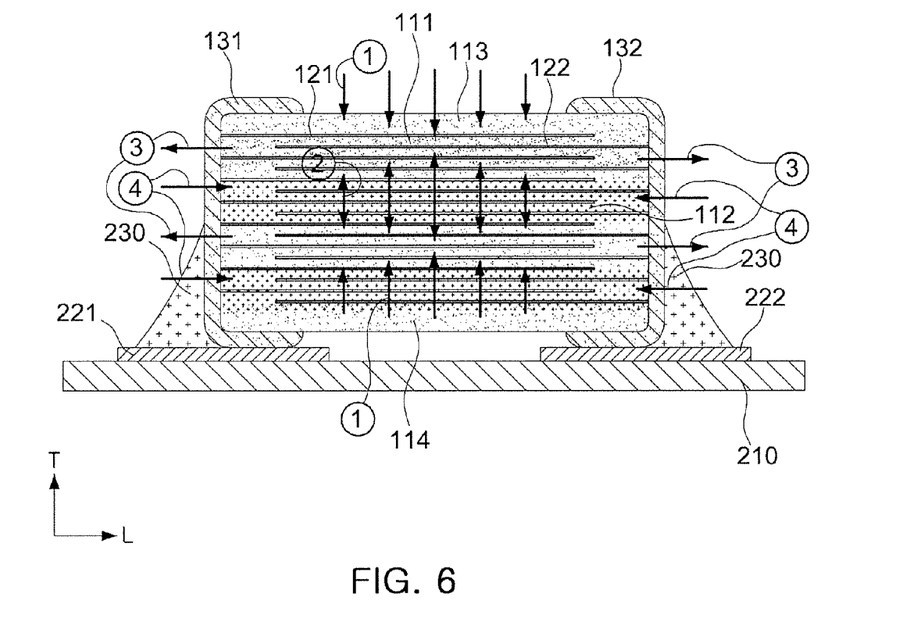
FIG. 6 is a cross-sectional view schematically illustrating a form in which ferroelectric layers of first active layers of the MLCC illustrated in FIG. 4 contract when a voltage is applied to the MLCC mounted on a board.
Figure 7:
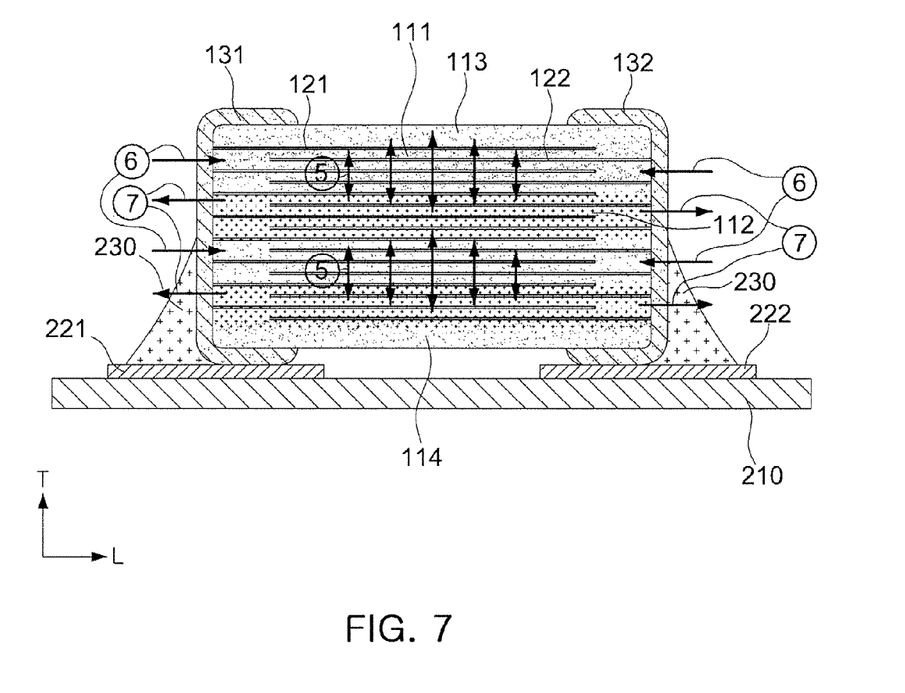
FIG. 7 is a cross-sectional view schematically illustrating a form in which the ferroelectric layers of the first active layers of the MLCC illustrated in FIG. 4 expand when a voltage is applied to the MLCC mounted on the board.

FIG. 6 is a cross-sectional view schematically illustrating a form in which the ferroelectric layers of the first active layers of the MLCC illustrated in FIG. 4 contract when a voltage is applied to the MLCC mounted on a board, and FIG. 7 is a cross-sectional view schematically illustrating a form in which the ferroelectric layers of the first active layers of the MLCC illustrated in FIG. 4 expand when a voltage is applied to the MLCC mounted on the board.

Referring to FIGS. 6 and 7, in a state in which the MLCC 100 is mounted on the substrate 210, when voltages having different polarities are applied to the first and second external electrodes 131 and 132 formed on the both end surfaces of the MLCC 100, the ceramic body 110 may expand and contract in the thickness direction due to the inverse piezoelectric effect of the dielectric layers 111, while the both end surfaces of the ceramic body 110 on which the first and second external electrodes 131 and 132 are formed may contract and expand due to the Poisson effect, in a manner contrary to that of the expansion and contraction of the ceramic body 110 in the thickness direction.

Referring to FIG. 6, when the first active layers of the MLCC 100 have expansive force ③ in the length direction, the ferroelectric layers 111 of the first active layers receive contractive force ① in the thickness direction, and on the other hand, the second active layers have contractive force ④ in the length direction due to a difference in dielectric constants between the first active layers and the second active layers and accordingly, the paraelectric layers 112 of the second active layers receive expansive force ② in the thickness direction.

Referring to FIG. 7, when the first active layers of the MLCC 100 have contractive force ⑥ in the length direction, the ferroelectric layers 111 of the first active layers receive expansive force ⑤ in the thickness direction, and on the other hand, the second active layers have expansive force ⑦ in the length direction due to the difference in dielectric constants between the first active layers and the second active layers and accordingly, and the paraelectric layers 112 of the second active layers receive contractive force in the thickness direction.

Thus, in the exemplary embodiment, when voltages are applied to the MLCC 100, the first active layers and the second active layers of the MLCC 100 expand and contract in a reverse manner, cancelling out mutual stress between the active layers, thus reducing acoustic noise.

As set forth above, according to exemplary embodiments of the present disclosure, a ceramic body may be formed such that first active layers including ferroelectric layers and second active layers including paraelectric layers are alternately stacked and thus, expansion and contraction stress caused by a piezoelectric behavior generated in the ferroelectric layers of the first active layers may be cancelled out by stress generated in the paraelectric layers of the second active layers in a reverse manner to that of that first active layers, whereby vibrations generated in an MLCC may be reduced, and thus, acoustic noise generated due to the vibrations transferred from the MLCC to a board may be reduced.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic component comprising:
a ceramic body having a plurality of dielectric layers stacked in the ceramic body;
active layers including a plurality of first and second internal electrodes disposed to be alternately exposed to end surfaces of the ceramic body, the dielectric layers being interposed between the first and second internal electrodes;
first and second external electrodes disposed on the end surfaces of the ceramic body and electrically connected to the first and second internal electrodes, respectively,
wherein the active layers include a plurality of first active layers including a ferroelectric layer and a plurality of second active layers including a paraelectric layer, the first and second active layers being alternately stacked, and
wherein each of the first and second active layers includes a plurality of the first internal electrodes and a plurality of the second internal electrodes.

2. The multilayer ceramic electronic component of claim 1, wherein the ferroelectric layer is formed of at least one of a solid solution of $(Ba_{1-x}Ca_x)_m(Ti_{1-y}Zr_y)O_3$, $BaTiO_3$, $PbTiO_3$, and $SrTiO_3$.

3. The multilayer ceramic electronic component of claim 1, wherein the paraelectric layer is formed of at least one of $(Ca,Sr)(Ti,Zr)O_3$, $BaO-TiO_2-Nd_2O_3$, and $CaTiO_3-MgTiO_3$.

4. The multilayer ceramic electronic component of claim 1, wherein a dielectric constant of the first active layer is 10 to 1,000 times that of the second active layer.

5. The multilayer ceramic electronic component of claim 1, wherein upper and lower cover layers are disposed on upper and lower portions of the active layers, respectively.

6. The multilayer ceramic electronic component of claim 5, wherein each of the upper and lower cover layers includes a ferroelectric layer.

7. A board having a multilayer ceramic electronic component, comprising:
a substrate having first and second electrode pads disposed on the substrate; and
the multilayer ceramic electronic component installed on the substrate,
the multilayer ceramic electronic component including:
a ceramic body having a plurality of dielectric layers stacked in the ceramic body;
active layers including a plurality of first and second internal electrodes disposed to be alternately exposed to end surfaces of the ceramic body, the dielectric layers being interposed between the first and second internal electrodes;
first and second external electrodes disposed on the end surfaces of the ceramic body and electrically connected to the first and second internal electrodes, respectively,
wherein the active layers include a plurality of first active layers including a ferroelectric layer and a plurality of second active layers including a paraelectric layer, the first and second active layers being alternately stacked, and
wherein each of the first and second active layers includes a plurality of the first internal electrodes and a plurality of the second internal electrodes.

8. The board of claim 7, wherein, in the multilayer ceramic electronic component, the ferroelectric layer is formed of at least one of a solid solution of $(Ba_{1-x}Ca_x)_m(Ti_{1-y}Zr_y)O_3$, $BaTiO_3$, $PbTiO_3$, and $SrTiO$.

9. The board of claim 7, wherein, in the multilayer ceramic electronic component, the paraelectric layer is formed of at least one of $(Ca,Sr)(Ti,Zr)O_3$, $BaO-TiO_2-Nd_2O_3$, and $CaTiO_3-MgTiO_3$.

10. The board of claim 7, wherein, in the multilayer ceramic electronic component, a dielectric constant of the first active layer is 10 to 1,000 times that of the second active layer.

11. The board of claim 7, wherein, in the multilayer ceramic electronic component, upper and lower cover layers are disposed on upper and lower portions of the active layers, respectively.

12. The board of claim 11, wherein each of the upper and lower cover layers includes a ferroelectric layer.

* * * * *